United States Patent
Steinke

[15] 3,677,583
[45] July 18, 1972

[54] BUSHING AND METHOD OF MANUFACTURING

[72] Inventor: Fred J. Steinke, South Bend, Ind.

[73] Assignee: Reliance Electric Company, Mishawaka, Ind.

[22] Filed: July 30, 1970

[21] Appl. No.: 59,481

[52] U.S. Cl. .................................287/52.06, 408/1
[51] Int. Cl. .............................................F16d 1/06
[58] Field of Search...............287/52.06; 408/1; 144/325

[56] References Cited

UNITED STATES PATENTS

| | | | |
|---|---|---|---|
| 2,509,711 | 5/1950 | Williams | 287/52.06 UX |
| 2,402,743 | 6/1946 | Firth | 287/52.06 UX |
| 419,558 | 1/1890 | Reeves | 408/1 |

Primary Examiner—Andrew V. Kundrat
Attorney—Marmaduke A. Hobbs, Maurice W. Green and Kemon, Palmer and Estabrook

[57] ABSTRACT

A method of fabricating tapered bushings for use with hubs having a tapered internal wall corresponding to the external taper on the bushing, for use with securing screws inserted in holes intersecting the tapered surfaces. The method includes the steps of placing the blanks having the tapered surfaces together and drilling a single hole in the area of contact between the two blanks and tapping the hole while said blanks are in contact with one another. The hole may be drilled with the bushings facing in opposite directions to one another with the blanks facing in the same direction, in which flattened surfaces are provided on the two blanks at the point of contact with one another. The bushing having the foregoing configuration with the flattened surfaces also constitutes a part of the present concept.

14 Claims, 8 Drawing Figures

Patented July 18, 1972

INVENTOR.
FRED J. STEINKE
BY
Hobbs & Green
ATTORNEYS

INVENTOR.
FRED J. STEINKE
BY Hobbs & Green
ATTORNEYS

BUSHING AND METHOD OF MANUFACTURING

An extensively used type of means for mounting sheaves, pulleys, gears, couplings and similar elements onto shafts consists of a tapered hub and bushing combination in which a split bushing with an external taper is inserted in a hub having a corresponding internal taper, and the assembly is mounted on a shaft and secured thereto by screws inserted in holes extending axially and intersecting the bushing and hub contact surfaces. As the screws are tightened, the two tapered surfaces are urged together, thus causing the bushing to contract around and grip the shaft, thereby securing the element to the shaft. Since the holes for the screws intersect the internal surface of the hub and the external surface of the bushing, and since only one longitudinal half of each of such holes is threaded, difficulty has frequently been encountered in machining the threads on the half holes, in that the tapping or threading tool is laterally unsupported. This difficulty is aggravated by the tapered surface which changes the cross sectional area machined from one end of the half hole to the other end. This same difficulty essentially exists in the initial drilling of the holes, since the drill is likewise laterally unsupported and hence tends to creep or deflect during the drilling operation. One method used in the past to overcome these difficulties has been to provide a boss on the side of the blank where the hole is to be drilled and, after the hole has been drilled and tapped, to remove the boss during the final machining operation, thus forming the desired half hole. This method, while producing satisfactory half holes, has been uneconomical and time consuming. It is, therefore, one of the principal objects of the present invention to provide a method of drilling and tapping half holes in tapered bushings, which eliminates or minimizes the lateral forces on the drill and tapping tool, and which substantially reduces the over all time required to machine the bushings.

Another object of the invention is to provide a method of drilling and/or tapping longitudinal grooves forming a portion of the bores for assembling tapered bushings and hubs, in which the grooves in two bushings are simultaneously drilled and/or tapped, each in a single operation and with a single tool, and which can be performed on standard tapered bushing blanks without any substantial modifications in the construction or design thereof.

Still another object of the invention is to provide a method for producing bushings having partial longitudinal screw holes, which assists in locating the center for the drill and retaining the drill on its true course, and which can be performed with standard tools normally used in performing the drilling and tapping operations on the conventional bushings.

Another object is to provide a method of forming threads, either by a rolling, tapping or other threading operation, in longitudinal partial holes of two bushing blanks, without the use of temporary bosses and with the tool being laterally supported.

A further object is to provide a bushing blank which is especially adapted to a machining operation involving the aforementioned method, and which assists in locating the center for the drill and retaining the drill in its centered position during the initial penetration of the blank by the drill, and to provide a bushing manufactured using the aforesaid special blank and the method described herein.

Additional objects and advantages of the invention will become apparent from the following description and accompanying drawings, wherein.

Figure 1:
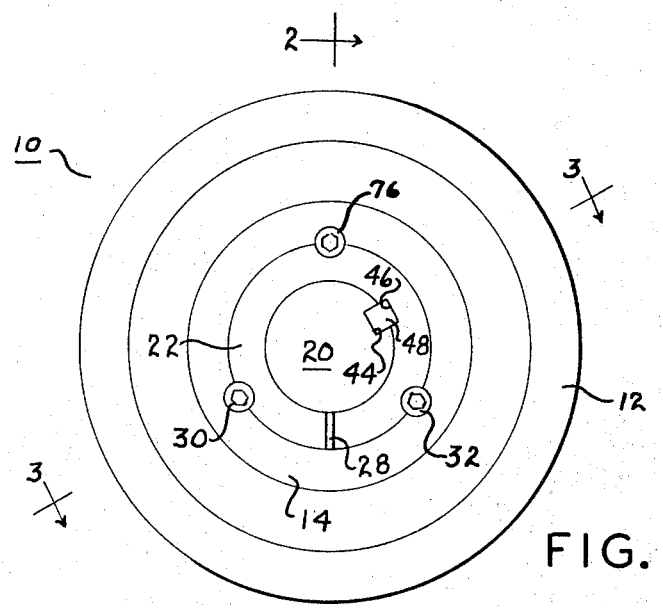
FIG. 1 is a side elevational view of a sheave illustrating the type of bushing to which the present method is applicable for the production thereof, the sheave and bushing being shown mounted on a shaft.

Referring more specifically to the drawings, wherein the present method is illustrated by the use of the type of device on which the present method is applicable, numeral 10 designates generally a sheave of the multiple V-belt drive type having a rim 12, a hub 14, and web 16 connected integrally with the hub and rim at the longitudinal center thereof. The rim contains a plurality of grooves for V-belts, and the sheave shown is mounted on a rotatable shaft 20 of a constant diameter. While the drawings illustrate a multiple groove sheave, the hub and bushing to which the present invention is applicable can be used equally as well with a variety of different types of elements, including, in addition to the type shown, pulleys, gears, sprockets, and shaft couplings. The manner in which the bushings are manufactured by the present method and the ultimate construction of the bushing are the same regardless of the type of power transmission element used in conjunction with the bushings.

Figures 2, 3:
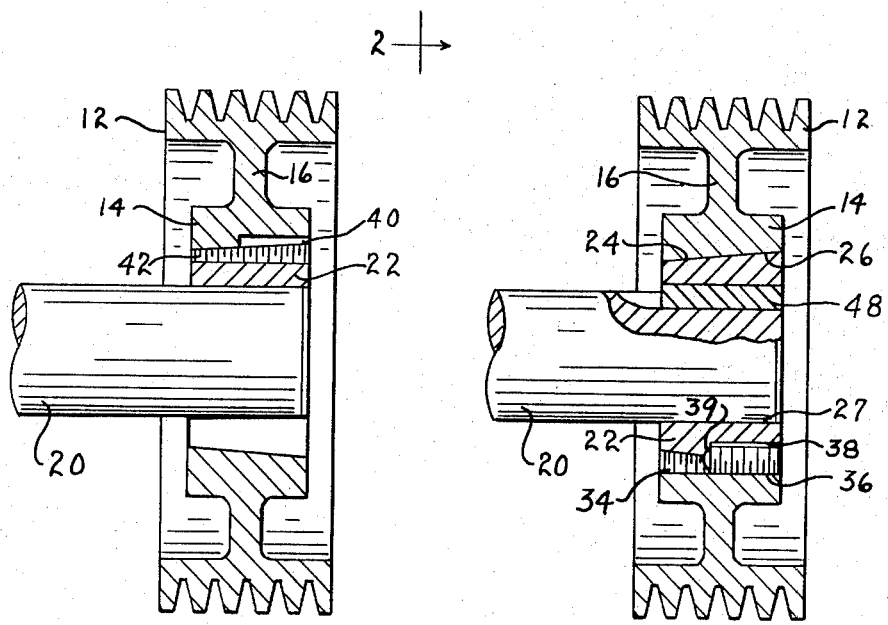
FIG. 2 is a cross sectional view of the sheave and bushing shown in FIG. 1, the section being taken on line 2—2 of the latter figure.
FIG. 3 is a cross sectional view of the sheave shown in FIG. 1, the section being taken on line 3—3 of the latter figure.
Figure 4:
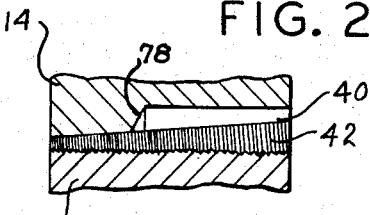
FIG. 4 is an enlarged fragmentary cross sectional view of a portion of the sheave and bushing illustrated in the preceding figures, showing more clearly the details of a jack screw hole intersecting contacting faces of a bushing and hub.

The hub 14 extends axially with the shaft 20 in spaced relation thereto, and the internal surface 26 is tapered from the right hand side as viewed in FIGS. 2 and 3 to the left hand side thereof. Mounted between hub 14 and shaft 20 is a split bushing 22 of substantially the same length as the hub and with an external surface 24 tapered to correspond to the taper on the internal surface 26 of the hub, and with an internal surface 27 being straight and parallel with the surface of the shaft. The bushing is continuous throughout with the exception of a radial slot 28 of sufficient width to permit the bushing to contract during installation to grip the shaft firmly, as will be more fully explained hereinafter. Tapered surfaces 24 and 26 of the bushing and hub, respectively, are assembled in face-to-face contact and are adapted to slide relative to one another as the sheave is assembled on the shaft and the bushing secured in place within the hub.

Bushing 22 is contracted into firm engagement with the shaft on which the sheave is mounted, and held rigidly in contact with the hub, by two screws 30 and 32, each being seated in a bore 34, one longitudinal portion 36 of which is formed in the internal surface 26 of hub 14 and the other portion 38 of which is formed in the external surface 24 of bushing 22. Bore 34 intersects contacting surfaces 24 and 26 of the bushing and hub, respectively, preferably approximately at the longitudinal center of the bore. Portion 36 of the bore contains screw threads corresponding to those of screws 30 and 32, and portion 38 is smooth, but of a radius of sufficient size to permit the screw to rotate freely in the threaded portion 36 without becoming disengaged therefrom. The length of bore portion 38 is such that the forward end of the screw will readily seat on the inner end portion 39 as the screw is tightened. Thereafter, further tightening of the screw forces the bushing inwardly relative to the hub and urges tapered surface 24 against and along the tapered surface 26, causing the bushing to contract and firmly grip and rigidly adhere to the shaft. While two screws 30 and 32 are used in the embodiment of the invention shown in the drawings, three or more may be used, particularly in large sheaves or other drive elements, though two will usually retain the element on the shaft under normal operating conditions. A hole 40 in the sides of the tapered surfaces of the bushing and hub for use in disassembling the bushing and hub, extends axially therein and intersects both tapered surfaces, the portion in the bushing forming a groove containing screw threads 42. Under some operating conditions, keyways 44 and 46 and key 48 may be used to augment the holding action of bushing 22 on the shaft.

The present concept is primarily concerned with the method of manufacturing the bushings, particularly the drilling and tapping of one or more holes or grooves in the bushings. The bushing blanks on which the present method is practiced, are illustrated in FIGS. 5, 6, 7, and 8, and are similar in most respects to the conventional or standard blank, including the tapered body portion 50 having slot 52, bore 54, and key slot 56. The periphery of each blank includes two grooves 58 and 60 extending approximately half the distance from one end of the blank to the other, as seen best in FIG. 5 of the drawings. The periphery also contains a groove 62 extending the full distance from one end of the body to the other. The present method is concerned primarily with the forming and/or threading of grooves or slots 62; however, the method can be partially practiced with respect to grooves 58 and 60.

Figure 5:
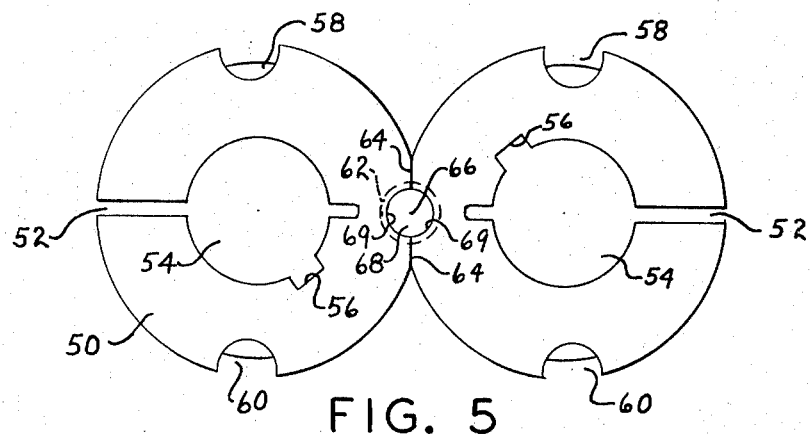
FIG. 5 is a plan view of two bushings in position for performing the method embodying the present invention, the bushing shown being of a special type specifically designed for the operation illustrated.
Figure 6:
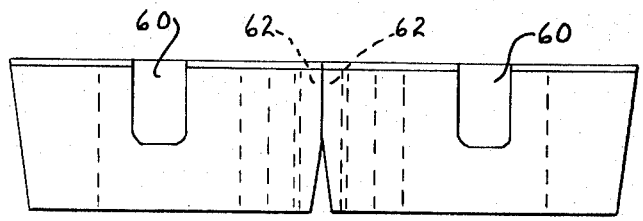
FIG. 6 is a side elevational view of the two bushings shown in FIG. 5.

As illustrated in FIGS. 5 and 6, each blank is provided with a flat area 64 adjacent the center point 66 of the intended hole 68. The flat areas of the blanks are placed in face-to-face contact, and the two blanks are clamped in a drilling machine and held firmly in that position while the blanks are simultaneously drilled to provide the two grooves 62 in each blank. After the grooves have been drilled, i.e., after the hole on center 66 has been bored, a tapping tool is used therein to thread both grooves 62 to obtain the threaded groove 69 in the periphery of each of the two blanks. The only difference between the two blanks used in this operation and the standard blank is the flat area 64 on each of the two blanks. These flat areas permit a full round hole to easily be started with the center between the two blanks and also assist in holding the retaining blanks firmly together in proper position for the drilling and tapping operation. This also allows the selection of a bolt circle independent of the bushing o.d. The two slots 58 and 60, which are not threaded, likewise can be drilled using the same type of arrangement, i.e., using the flat area on the blank periphery on opposite sides of the intended groove and placing the flat areas together for the drilling operation, in the same manner as previously described. This permits a full round hole to be drilled, using a center on the line defined by the two contacting flat areas.

It is seen that by either of the foregoing methods a full round hole is utilized in producing both the drilling and threading operations, even though the ultimate configuration of the hole in each bushing extends only a portion of the distance. The simultaneous drilling of the two bushings provides effective lateral support in all directions to both the drill and tapping tool and eliminates the need for a temporary boss on the side of the blank which must be machined from the bushing.

Figure 7:
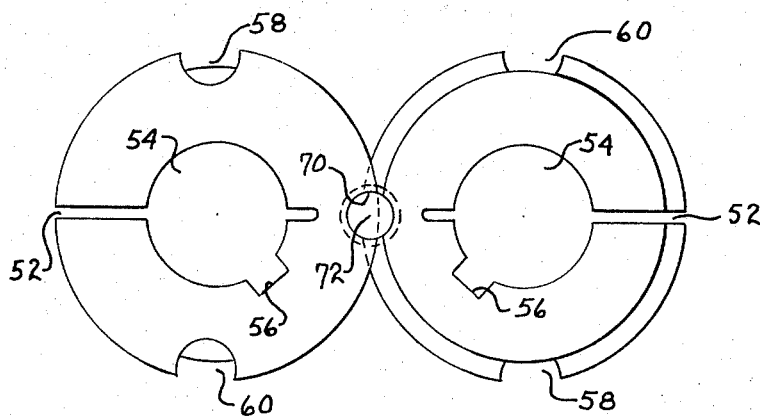
FIG. 7 is a plan view of two conventional bushings illustrating a modified form of the present invention.
Figure 8:
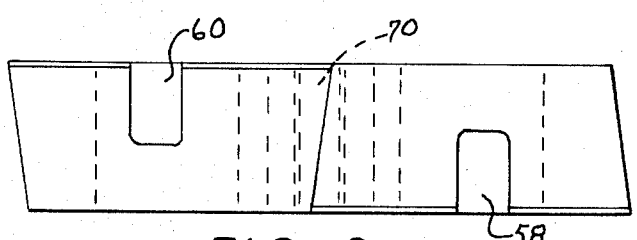
FIG. 8 is a side elevational view of the two bushings shown in FIG. 7.

In the embodiment of the invention illustrated in FIGS. 7 and 8, the blanks are identical to those used for the standard bushings; however, in this particular mode of practicing the invention, one of the blanks is reversed with respect to the other so that the tapered sides of the two blanks will fit together with the axes of the two bushings being in parallel relationship. With the blanks held together in this manner, a full round hole 70 on center 72 is drilled, starting inwardly from the periphery of one of the blanks on one side and terminating inwardly from the periphery of the other blank on the other side at the terminal end of the hole. After the hole has been drilled with the two blanks held together in the reverse manner shown in the drawings, the tapping operation can be performed without disassembling the two blanks.

Upon completion of the drilling and the tapping operations, the bushings are used in the same manner as the conventional tapered bushings with screws 30 and 32 seating in tapped groove portions 36 and straight bore portions 38. A screw 76, similar to screws 30 and 32, is used to disassemble the drive element by inserting it in hole 40 until the end thereof seats on end 78; thereafter further turning of the screw applies pressure to the bushing and hub in the direction to separate the tapered surfaces thereof and permit easy disassembling of the transmission element from the bushing.

In the description of the method involving the present invention, reference has been made to drilling and tapping the half-holes. This method can be successfully employed forming threads by a rolling as well as a tapping operation, either in drilled holes or preformed holes such as normally provided when the bushing blank is made by a sintered metal process. The method of the present invention is not limited to specific types of hole forming and threading operations. While only two embodiments of the present method of manufacturing tapered bushings have been described in detail herein, various changes and modifications may also be made in the steps of the method without departing from the scope of the invention.

I claim:

1. In a method of fabricating tapered bushings for use with hubs having a tapered internal wall corresponding to the external taper on the bushings for use with securing screws inserted in holes intersecting said tapered surfaces: the steps including forming two essentially identical metal blanks each having tapered external surfaces with a groove in the surface parallel with the axis of the blank, placing said blanks side-by-side with their peripheries in contact and their axes parallel with one another and with the grooves in juxtaposition to form a round hole intersecting the contacting surfaces, one half of said hole being in one of said blanks and the other half being in the other of said blanks, and threading said hole while said blanks are held in contact with one another.

2. The method of fabricating tapered bushings as defined in claim 1 in which said threading step is performed by a tapping operation.

3. The method of fabricating tapered bushings as defined in claim 1 in which said threading step is performed by a thread rolling operation.

4. In a method of fabricating tapered bushings for use with hubs having a tapered internal wall corresponding to the external taper on the bushings for use with securing screws inserted in holes intersecting said tapered surfaces: the steps including forming two essentially identical metal blanks each having tapered external surfaces, placing two of said blanks side-by-side with their peripheries in contact and their axes parallel with one another, forming a hole parallelling the axis of said blanks and intersecting the contacting surfaces, one half of said hole being in one of said blanks and the other half being in the other of said blanks.

5. The method of fabricating tapered bushings as defined in claim 4 in which the tapered surfaces of said blanks face in opposite directions and are held in contact with one another throughout substantially their full axial length.

6. The method of fabricating tapered bushings as defined in claim 4 in which said hole is threaded while said blanks are being held together.

7. The method of fabricating tapered bushings as defined in claim 6 in which said blanks are placed together with the tapered surfaces facing in the same direction and the area of contact between the two blanks is a flat surface.

8. In a method of fabricating tapered bushings for use with hubs having a tapered internal wall corresponding to the external taper on the bushings for use with securing screws inserted in holes intersecting said tapered surfaces: the steps including forming two metal blanks each having tapered external surfaces with a flat area parallel with the axis of the bushing, placing two of said tapered blanks together with the taper facing in the same direction and with the flat areas in face-to-face contact with one another, and forming a hole on a line with the plane of said contacting areas and parallel with the axis of the two bushings.

9. The method of fabricating tapered bushings as defined in claim 8 in which is included the step of threading said hole while said blanks are together.

10. The method of fabricating tapered bushings as defined in claim 9 in which said hole is threaded substantially the full length thereof.

11. A bushing for use with hubs having a tapered internal wall for use with securing screws inserted in holes intersecting the tapered surface, comprising a frusto-conically shaped body having two screw receiving grooves substantially diametrically opposite to one another and in parallel relationship to the axis of the blank, a third groove disposed in a parallel relationship with the axis of the blank and having screw threads therein, and a flat surface parallel with the axis of the blank on either side of said last mentioned groove.

12. The bushing as defined in claim 11 in which said last mentioned groove extends substantially the full length of the bushing.

13. The bushing as defined in claim 12 in which said last mentioned groove contains screw threads throughout substantially the full length thereof.

14. The bushing as defined in claim 11 in which said body has a single slot extending axially through the body and positioned approximately equally between said first mentioned grooves.

* * * * *